(12) United States Patent
Watanabe

(10) Patent No.: US 6,925,446 B2
(45) Date of Patent: Aug. 2, 2005

(54) PURCHASE PRICE, AUCTION SERVER, PRODUCT RETAILING METHOD, PRODUCT PURCHASING METHOD, PROGRAM STORAGE DEVICE, AND PROGRAM TRANSMISSION APPARATUS THEREFOR

(75) Inventor: Hideo Watanabe, Machida (JP)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 09/790,733

(22) Filed: Feb. 22, 2001

(65) Prior Publication Data

US 2001/0029479 A1 Oct. 11, 2001

(30) Foreign Application Priority Data

Mar. 31, 2000 (JP) ....................................... 2000-099101

(51) Int. Cl.$^7$ .............................................. G06F 17/60
(52) U.S. Cl. ........................................... 705/26; 705/37
(58) Field of Search ............................... 705/26, 37, 35

(56) References Cited

U.S. PATENT DOCUMENTS

| | | | | |
|---|---|---|---|---|
| 3,581,072 A | * | 5/1971 | Nymeyer ...................... | 705/37 |
| 5,835,896 A | * | 11/1998 | Fisher et al. ................... | 705/37 |
| 5,890,138 A | * | 3/1999 | Godin et al. ................... | 705/26 |
| 6,101,484 A | * | 8/2000 | Halbert et al. ................. | 705/26 |
| 6,415,270 B1 | * | 7/2002 | Rackson et al. ............... | 705/37 |
| 6,629,082 B1 | * | 9/2003 | Hambrecht et al. ........... | 705/37 |
| 2001/0042039 A1 | * | 11/2001 | Rupp et al. .................... | 705/37 |
| 2004/0039685 A1 | * | 2/2004 | Hambrecht et al. ........... | 705/37 |

FOREIGN PATENT DOCUMENTS

| | | | | |
|---|---|---|---|---|
| JP | 0095659 | * | 4/1995 | ........... G06F/19/00 |
| JP | 10-320494 | | 12/1998 | |
| JP | 11-007467 | | 1/1999 | |
| JP | 2000-082098 | | 3/2000 | |

OTHER PUBLICATIONS

Flexible double auctions for electronic commerce: theory and implementation, Peter R. Wurman, Artificial Intelligence Laboratory, University of Michigan, 1998.*

* cited by examiner

*Primary Examiner*—Jeffrey A. Smith
*Assistant Examiner*—Matthew S Gart
(74) *Attorney, Agent, or Firm*—Keusey, Tutunjian & Bitetto, P.C.; Thu Ann Dang (57) ABSTRACT

A purchase price bid research system comprises: a mediator server connected to a communication network and to intending purchaser terminals, wherein the intending purchaser terminals transmit purchase price bids for a product to the mediator server, and from among the purchase price bids for the product tendered by the intending purchaser terminals, the mediator server determines, as effective purchase price bids, values that are equal to or higher than a lowest price designated in advance for the product, and employs the effective purchase price bids tendered by intending purchasers to calculate a standard purchase price for the product.

9 Claims, 7 Drawing Sheets

PURCHASE PRICE, AUCTION SERVER, PRODUCT RETAILING METHOD, PRODUCT PURCHASING METHOD, PROGRAM STORAGE DEVICE, AND PROGRAM TRANSMISSION APPARATUS THEREFOR

FIELD OF THE INVENTION

The present invention relates to an electronic commerce system, for use on a communication network, for determining appropriate retail prices for products based on purchase price bids tendered by intending purchasers of the products.

BACKGROUND OF THE INVENTION

Background Art

Recently, electronic commerce, involving the use of networks such as the Internet, has come to be widely employed, and various sales schemes, including auction sales, have been implemented using communication networks.

For common retail transactions, venders take the initiative in determining the prices of the products that are sold. Specifically, to calculate a retail price for a product, a retailer adds together procurement and handling costs, which roughly include manufacturing costs, wholesale charges, transportation expenses and employee wages, and an appropriate, anticipated added profit. In this case, how to arrive at an appropriate added profit is a problem, because whatever amount is added, the retail price is increased. Thus, if the added profit is too high, the retail price will likewise be too high, and sales of the product will suffer, as will the possibility that a satisfactory profit will be obtained. Whereas, if the added profit is lower, sales of the product will increase, and a satisfactory profit will be realized, but only if a large number of products are sold. Therefore, in order to determine an appropriate retail price, past prices of similar products and the prices of products established by other, competing companies must be examined, and probable demands must be predicted. Therefore, the accuracy of predicted demands will greatly affect earnings.

An auction sale is a system whereby intending purchasers of a product determine the price of the product. For auction sales, there are systems whereby a buyer sets a higher price by making a successful bid, and systems whereby a buyer sets a lower price by making a successful bid and such a system can be selected in accordance with the product type.

In stock dealings, to determine the stock price of a newly opened corporation entity, a competitive tender formula or a book building formula is normally employed. However, since an upper tender limit is set for the competitive tender formula, high bids tend to be offered. On the other hand, according to the book building formula, a search of the attitudes of institutional investors is the important factor in determining the stock price; however, since the answerer usually submits an acceptable price, a low price tends to be set.

These methods for determining the retail price and the business trading system employing these methods are employed in the same manner for electronic commerce using a communication network.

As is described above, the conventional method for determining the retail price of a product in the electronic commerce is the same as the method used for general trading, and accordingly, has the same shortcomings.

That is, since according to the method for determining a retail price by adding a profit to a procurement cost, a price is determined by predicting the demand based on past sales records (sales of similar products or competitive products), a satisfactory profit can not be obtained if the demand prediction is not accurate.

Further, according to the method whereby intending purchasers take the initiative in determining the price in an auction sale, since a product is sold to a buyer who offered the highest value or the lowest value, the contracted price for a product tends to be biased so that it is either too high or too low. Thus, this method is not very useful when determining the retail price of a product.

In addition, in accordance with the competitive tender formula and the book building formula that is employed to determine the price of the stock of a newly opened corporation on the stock market, the price obtained by tendering or searching is biased so it is higher or lower than an appropriate price (as asked on the market) for the product. Therefore, immediately after a stock is placed on the open market at a specific price, its price rises or falls, dramatically.

SUMMARY OF THE INVENTION

It is, therefore, one object of the present invention to determine, for electronic commerce, an appropriate retail price for a product based on a purchase price bid that is tendered by intending purchasers of the product.

It is another object of the present invention to provide a retailing system, for electronic commerce, for the retail sale of a product at a price desired by an average intending purchaser of a product.

To achieve the above objects, according to the present invention, the following purchase price bid research system is employed. Specifically, a purchase price bid research system comprises: a mediator server connected to a communication network and to intending purchaser terminals, wherein the intending purchaser terminals transmit purchase price bids for a product to the mediator server, and from among the purchase price bids for the product tendered by the intending purchaser terminals, the mediator server determines, as effective purchase price bids, values that are equal to or higher than a lowest price designated in advance for the product, and employs the effective purchase price bids tendered by intending purchasers to calculate a standard purchase price for the product. A standard purchase price can be defined as a value at the center of a set of purchase price bids, thus, an average of the purchase price bids or a value in the middle of the data acquired for purchase price bids when they are arranged in order. The definition of a standard purchase price may also be determined in accordance with the product type or the retail form.

The mediator server does not open the lowest price to the intending purchaser terminals. This is because if the lowest price is opened, the purchase price bids are concentrated near the lowest price, and an appropriate retail price can not be determined.

Further, according to the present invention, the following product provision system is employed. Specifically, a product provision system comprises: a product provision server used by a product provider to provide a product; and intending purchaser terminals, which are connected via a communication network to the product provision server, for tendering a purchase price bid for the product, wherein, from among the purchase price bids tendered for the product by the intending purchaser terminals, the product provision server determines, as effective purchase price bids, values that are equal to or higher than a lowest price designated in advance for the product, calculates a winning price range based on the effective purchase price bids and the count of the product to be provided, and provides the product to intending purchasers that tendered the purchase price bids falling within the winning price range.

The product provision server employs the effective purchase price bids to calculate a standard purchase price tendered by intending purchasers of the product, and defines, as the winning price range, a price range within which are included the purchase price bids in a number equivalent to the count of units of the product to be provided, arranged in order beginning with the purchase price bid that is closest to the standard purchase price. With this configuration, the winning price range can be defined as an appropriate range that includes the standard purchase price that is obtained based on purchase price bids tendered by intending purchasers.

Thus, the product provision server provides the product for intending purchasers at tendered purchase price bids. This configuration is preferable because, since an intending purchaser can obtain a product at his or her tendered bid, the intending purchaser can enter, as a purchase price bid, a price that he or she regards as reasonable for the product.

The product provision server provides the product and a remuneration for an intending purchaser whose tendered purchase price bid is an included winning price range value and is especially close to the standard purchase price. This configuration is preferable because, since a special favor is provided for the intending purchaser who tendered the purchase price bid that is closest to the standard purchase price, an intending purchaser can be motivated to tender a purchase price bid that seems suitable for a product, without the price being biased so it is too high or too low.

For the intending purchaser who has tendered the purchase price bid that is especially close to the standard purchase price, the remuneration may be provided at no cost, regardless of the purchase price bid.

Further, according to the present invention, an auction server, for accepting a price bid for a product put up for auction via a communication network in support of a network auction sale, comprises: information opening means for opening, to intending purchasers, information concerning the product put up for auction; price bid acceptance means for accepting purchase price bids tendered by the intending purchasers; and winner determination means for employing the accepted purchase price bids to calculate a standard purchase price to be charged intending purchasers for the product put up for auction, and for determining, as winners for the purchase of the product put up for auction, intending purchasers, in a number equivalent to the count of the individual units of the product put up for auction, arranged in order beginning with the intending purchaser whose purchase price bid is closest to the standard purchase price.

A homepage may be employed as the information opening means and the price bid acceptance means for a product put up for auction. Thus, an intending purchaser can read the homepage using a web browser, and can obtain information concerning the product that is up for auction. And thereafter, the intending purchaser can tender a purchase price bid for the product to the price bid acceptance homepage. Therefore, the above configuration is superior because a widely employed network system, such as the Internet, can be employed to acquire intending purchasers.

The winner determination means determines, as a remuneration recipient, the intending purchaser who tendered a purchase price bid especially close to the standard purchase price. This configuration is preferable because an intending purchaser can be motivated to define, as a purchase price bid, a price that seems reasonable for the purchase of the product, without the value being biased so it is too high or too low.

The winner determination means defines, as effective purchase price bids, the purchase price bids that are equal to or higher than the lowest price designated in advance for the product put up for auction, and employs the effective purchase price bids to calculate the standard purchase price. This configuration is preferable because unrealistic purchase price bids, such as 0 yen or 1 yen, can be eliminated.

Further, according to the present invention, a product retailing method for the network auction sale of a product across a communication network comprises the steps of: using a homepage to open to intending purchasers' information for the product; employing the homepage to accept purchase price bids tendered by the intending purchasers; determining, as winners of right to purchase the product, intending purchasers whose purchase price bids are included in a winning price range that is defined using the purchase price bids and the count of the units of the product that are to be provided; and selling the product to the winners at the purchase price bids that are tendered.

The step of determining the winners includes the steps of: employing the accepted purchase price bids tendered by the intending purchasers of the product to calculate a standard purchase price; and defining, as the winning price range, a price range that includes purchase price bids tendered in a number equivalent to the count of units of the product that is offered, arranged in order beginning with a purchase price bid that is close to the standard purchase price. With this configuration, the winning price range can be defined as an appropriate range that includes the standard purchase price that is calculated using the purchase price bids tendered by the intending purchasers.

Further, the product retailing method comprises an additional step of: determining, as a remuneration recipient, an intending purchaser who tendered a purchase price bid especially close to the standard purchase price, wherein the step of selling the product includes a step of providing the product at no cost to the remuneration recipient, regardless of the purchase price bid tendered by the remuneration recipient. This configuration is preferable because, since a product is provided at no cost to an intending purchaser whose purchase price bid is nearest the standard purchase price, motivation is provided for intending purchasers to tender purchase price bids that seem most suitable for a product, without the value of the product being biased so it is too high or too low.

According to the present invention, a product purchasing method for employing an information communication terminal to purchase a product via a communication network comprises the steps of: submitting to a bid acceptance homepage a purchase price bid for a desired product; and purchasing the product at the purchase price bid when the purchase price bid is included in a winning price range that is defined in accordance with the count of the units of the product to be provided and based on a standard purchase price that is calculated for the product based on all the effective purchase price bids tendered for the product.

Furthermore, according to the present invention, a storage medium is provided that input means of a computer employs to store a computer-readable program that permits the computer to perform: a process for opening to intending purchasers across a communication network information concerning a product put up for auction; a process for accepting, across the communication network, purchase price bids tendered by the intending purchasers; and a process for employing the accepted purchase price bids to calculate for the intending purchasers a standard purchase price for the purchase of the product put up for auction, and for determining, as winners of the right to purchase the product put up for auction, intending purchasers, in a number equivalent to the count of the units of the product put up for auction, that are arranged in order beginning with an intending purchaser whose purchase price bid is nearest the standard purchase price. With this configuration, a computer that has installed this program can conduct an auction whereof a winner is determined to be an intending purchaser whose purchase price bid is nearest the standard purchase price tendered by the intending purchasers of the product put up for auction.

According to the present invention, a program transmission apparatus comprises: storage means for storing a program that permits a computer to perform a process for opening to intending purchasers information concerning a product put up for auction across a communication network, a process for accepting purchase price bids tendered by the intending purchasers across the communication network, and a process for employing the accepted purchase price bids to calculate a standard purchase price for the intending purchasers for the product put up for auction, and for determining, as the winners of the product put up for auction, intending purchasers, in a number equivalent to the count of the units to be provided of the product put up for auction, arranged in order, beginning with the intending purchaser whose purchase price bid is nearest the standard purchase price; and transmission means for reading the program from the storage means and for transmitting the program. With this configuration, a computer to which this program has been downloaded can conduct an auction whereby a winner is determined to be an intending purchaser whose purchase price bid is nearest the standard purchase price calculated for the intending purchasers for the purchase of the product put up for auction.

DETAILED DESCRIPTION OF INVENTION

A preferred embodiment of the present invention will now be described in detail while referring to the accompanying drawings.

Figure 1:
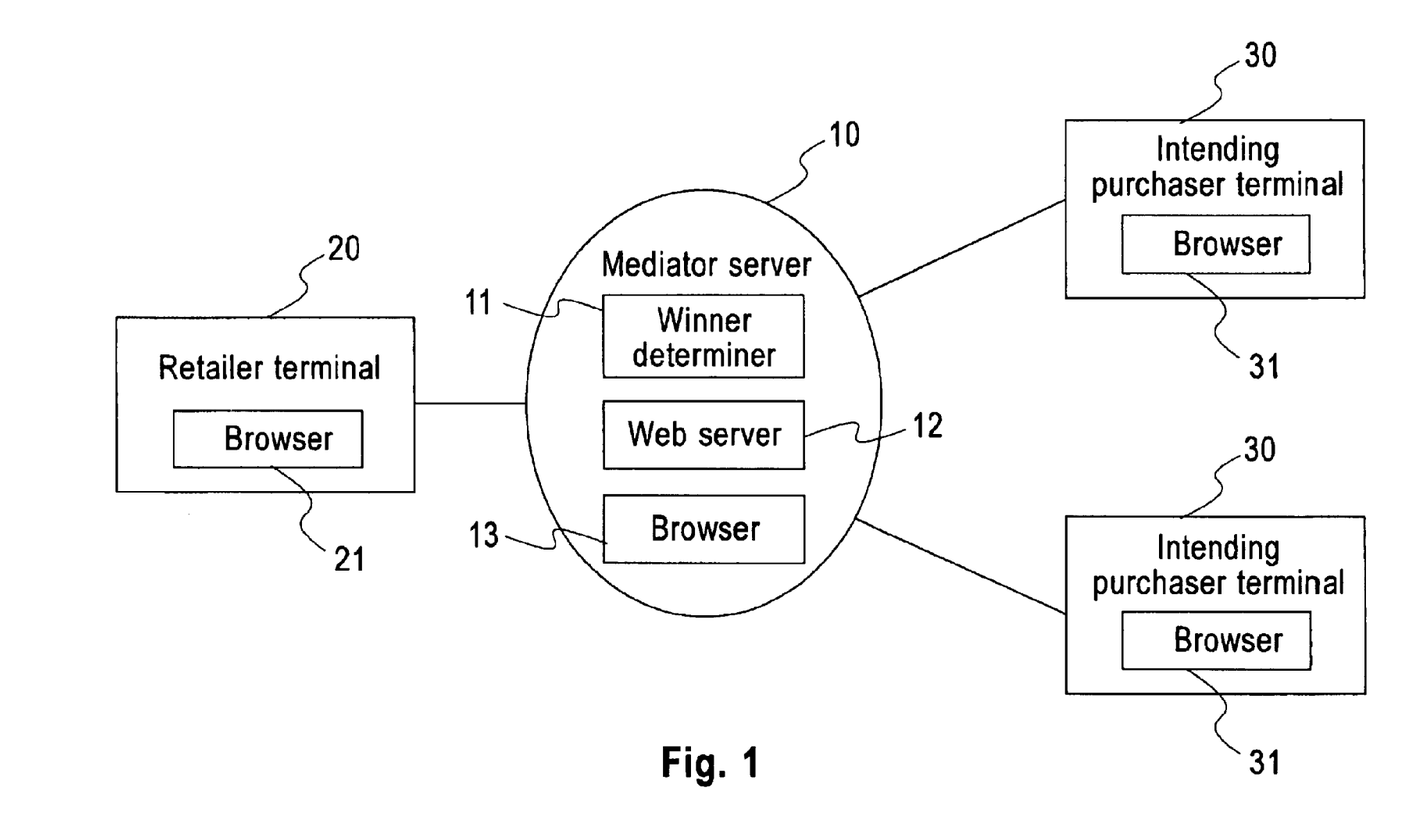
FIG. 1 is a diagram showing the general configuration of a retail price determination system according to the embodiment.

FIG. 1 is a diagram showing the general configuration of a retail price determination system according to the embodiment.

In FIG. 1, a mediator server 10 presents product information and accepts purchase applications from intending purchasers, and determines which of the intending purchasers is a winner (a product purchaser). A retailer terminal 20 is used by a product retailer, and an intending purchaser terminal 30 is used by an intending purchaser. In this system, the mediator server 10 and the retailer terminal 20 are separately provided; however, the functions performed by these terminals may be combined and assigned to a single system apparatus. The mediator server 10, the retailer terminal 20 and the intending purchaser terminal 30 are interconnected by a network. The network can be the Internet or another communication network, such as a WAN (Wide Area Network) or a LAN (Local Area Network).

The functions of the mediator server 10 are performed by a computer system, such as a workstation or a personal computer. The mediator server 10 receives product information from the retailer terminal 20, opens it to the public and prepares to accept purchase applications from intending purchaser terminals 30, and determines a winner. As is shown in FIG. 1, the mediator server 10 comprises: a winner determiner 11 for determining which of the intending purchasers is a winner; a web server 12 for providing, for a client (a browser), an HTML homepage that is prepared to accept product information and purchase applications; and a browser 13 for browsing its homepage. The retailer terminal 20 and the intending purchaser terminal 30 are implemented by a computer system, such as a workstation or a personal computer, a PDA (Personal Digital Assistant) or another information communication terminal, and include browsers 21 and 31 for browsing homepages.

Figure 2:
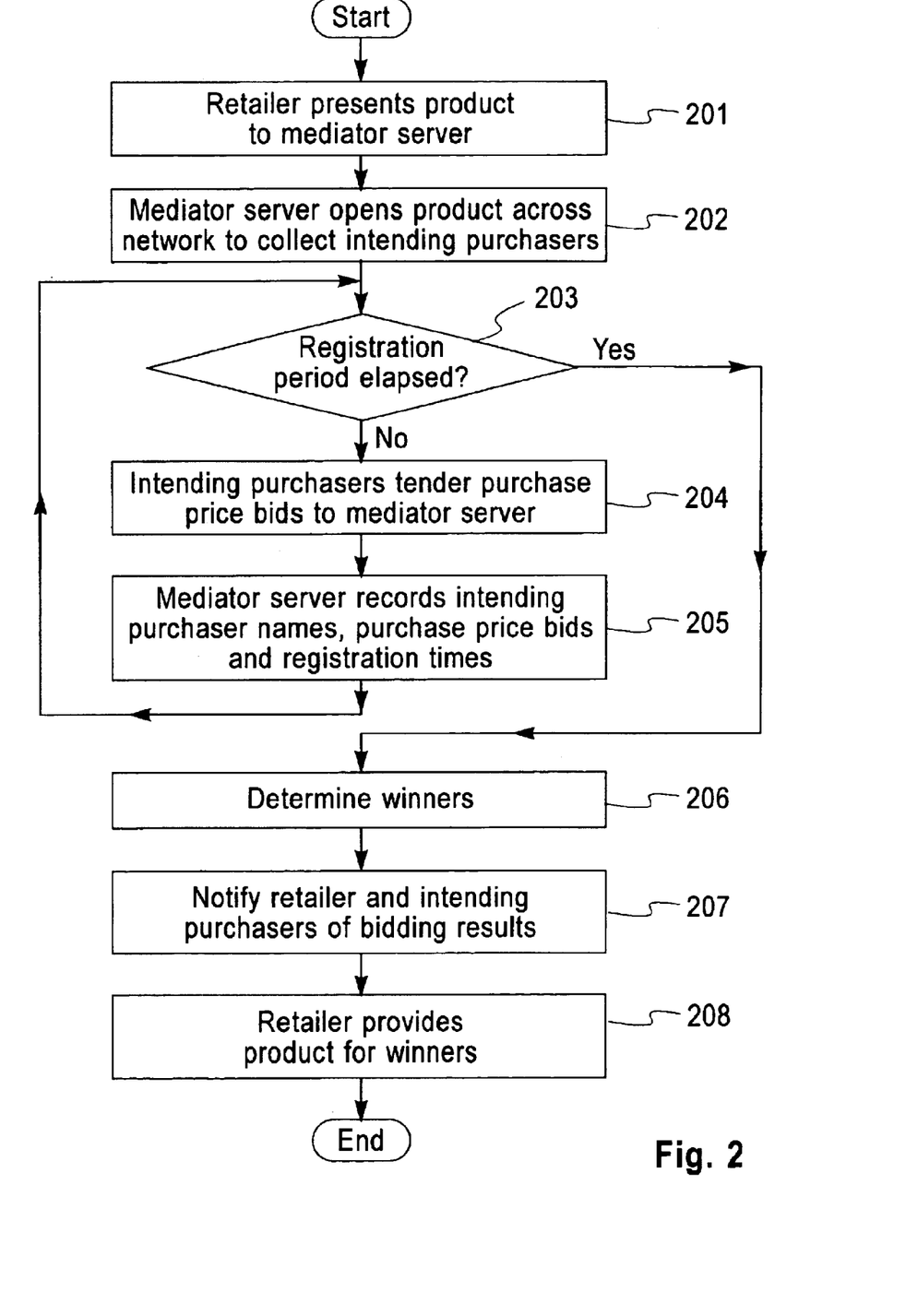
FIG. 2 is a flowchart for explaining an overview of the processing for determining a retail price according to the embodiment.

FIG. 2 is a flowchart for explaining an overview of the retailing price determination operation according to the embodiment. In FIG. 2, in this embodiment, first a retailer presents a product to the mediator server 10 (step 201). The mediator server 10 opens the product across a network, and collects purchase applications for the product (step 202). Product information, which will be described later, is used for the presentation of the product by the retailer and the opening of the product by the mediator server 10. The retailer provides as product information the number of the units of the product to be sold and the lowest price. A detailed description of the product information will be given later. The intending purchasers register their purchase applications with the mediator server 10 during a predetermined registration period by tendering purchase price bids for the product (steps 203 to 205).

Subsequently, the mediator server 10 determines which of the registered intending purchasers is a winner (step 206). This determination of the winner is performed as follows. First, an appropriate price (hereinafter referred to as a standard retail price) for the product is calculated based on the purchase price bids tendered by the intending purchasers. The standard retail price is defined as a representative value for a set of effective purchase price bids. This representative value is a value located in the center of the set of purchase price bids, and for it the following definition can be employed:

1. The average value of all the data (purchase price bids).
2. The average value of data other than data in the upper and lower appropriate range.
3. The center value (the value located in the middle of the data, which are arranged in order).
4. The average value or the center value in one of a number of sub-ranges that are obtained by dividing at the same intervals a range that extends from the lowest price bid to the highest, where the most purchase price bids are concentrated.

The definition of the representative value may be determined in accordance with the product type and the retailing style.

An effective purchase price bid is one that is equal to or higher than the lowest price for the product. The lowest price is set in order to eliminate the submission of unrealistic purchase price bids, such as ones for 0 yen or 1 yen. It should be noted that the lowest price is not made available to the intending purchasers. This is done because were the lowest price made available, intending purchasers would tender purchase price bids grouped near the lowest price, so that the obtained standard price would be far from that which the product demanders deem a reasonable price for the product. The intending purchasers are selected in order, beginning with the one who tendered the purchase price bid that is closest to the standard retail price, in a number equivalent to the number of units of the product to be provided, and are determined to be winners. Unlike an ordinary auction where the highest bidder obtains a product, the bidders whose offers are closest to the standard retail price obtain the product, so it can be expected that intending purchasers will submit purchase offers that they believe are appropriate prices for the product.

When the winners are determined, this determination is reported to the retailer and the intending purchasers (step 207). Upon the receipt of this result, the retailer provides the product for the winner (step 208).

The processing performed by the mediator server 10 and the terminals 20 and 30 in this embodiment will be described in further detail while referring to FIGS. 3 to 6. First, the retailer of the product furnishes product information using the retailer terminal 20.

Figure 3:
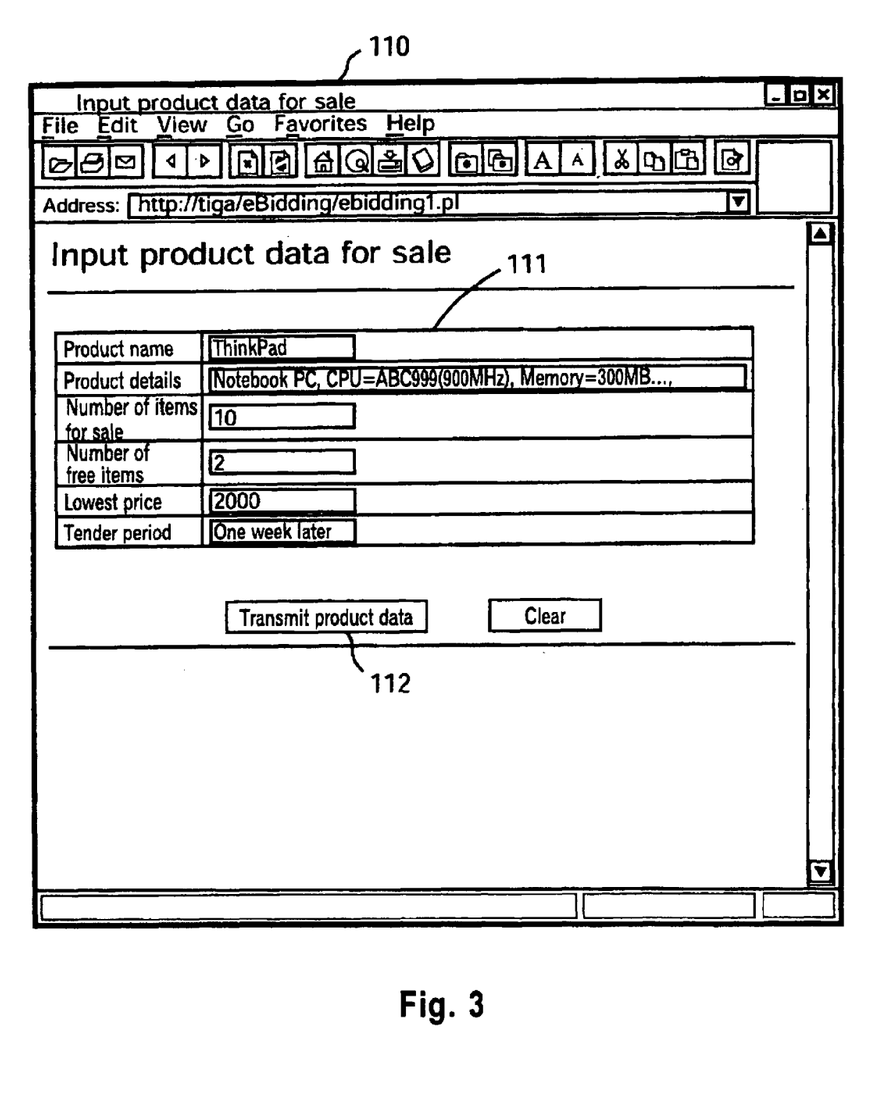
FIG. 3 is a diagram showing an example product information input screen displayed on a retailer terminal according to the embodiment.

FIG. 3 is a diagram showing an example product information input screen displayed by the retailer terminal 20. An input screen 110 is the screen displayed by the browser 21 of the retailer terminal 20. The format used for the screen is provided as a homepage by the web server 12 of the mediator server 10.

In FIG. 3, an information input column 111 and a product data transmission button 112 are provided on the input screen 110 for the entry of product information. A product name, detailed product information, the number of units for sale, the number of free units to be provided, the lowest price and a registration period (written as a tender period in FIG. 3) are provided as input items in the information input column 111. Among these input items, the type and specifications of a product and other necessary information concerning the product to be reported to intending purchasers are entered as detailed product information. In order to provide sufficient information to help intending purchasers to decide on suitable prices for the product for inclusion in purchase price bids, the information entered here must be detailed and complete.

The number of units for sale indicates the count of the units of the pertinent product that will be provided. The number of free items indicates the count of the units of the pertinent product that will be provided at no cost from among the number of units for sale. In this embodiment, the number of units indicated in the column for the number of free units to be provided are given to the intending purchasers who tendered purchase price bids that are the same as or are the closest to the standard retail price, the above described representative value. Since a special favor is provided for the intending purchasers who tendered purchase price bids that are closest to the standard retail price, it is possible thereby to provide motivation for the submission by intending purchasers of purchase price bids based on prices that can be regarded as suitable for a product, without the value of the product being biased so that it is too high or too low. Further, while in this embodiment, free products are provided as special favors, other special favors may be provided.

The lowest price is the lowest purchase price bid that can be used to calculate the standard retail price of the product. As is described above, this price is set in order to eliminate ridiculous, unrealistically low purchase price offers. The registration period indicates the period during which purchase applications from the intending purchaser terminals 30 can be accepted and registered. When the registration period has elapsed, no further purchase applications will be accepted and registered, and the purchase price bids that up to that time have been registered are employed to calculate the standard retail price and to determine the winners. It should be noted that, as is shown in FIG. 3, a relative time, "one week later", may be entered for the registration period, or that a specific date may be provided.

The retailer of the product completes the entry of information in the information input column 111 of the input screen 110 displayed on the retailer terminal 20, clicks on the product data transmission button 112, and transmits to the mediator server 10 the product information in the information input column 111. The input screen 110 is merely an example interface for the input of product information, and so long as the same information can be entered, the format is not limited to the one shown in FIG. 3. Further, means other than the homepage can be employed, and the entries in the information input column 111 can be modified in accordance with the product type and the retail style, without affecting the registration of the purchase applications and the designation of the purchase price bid.

Figure 4:
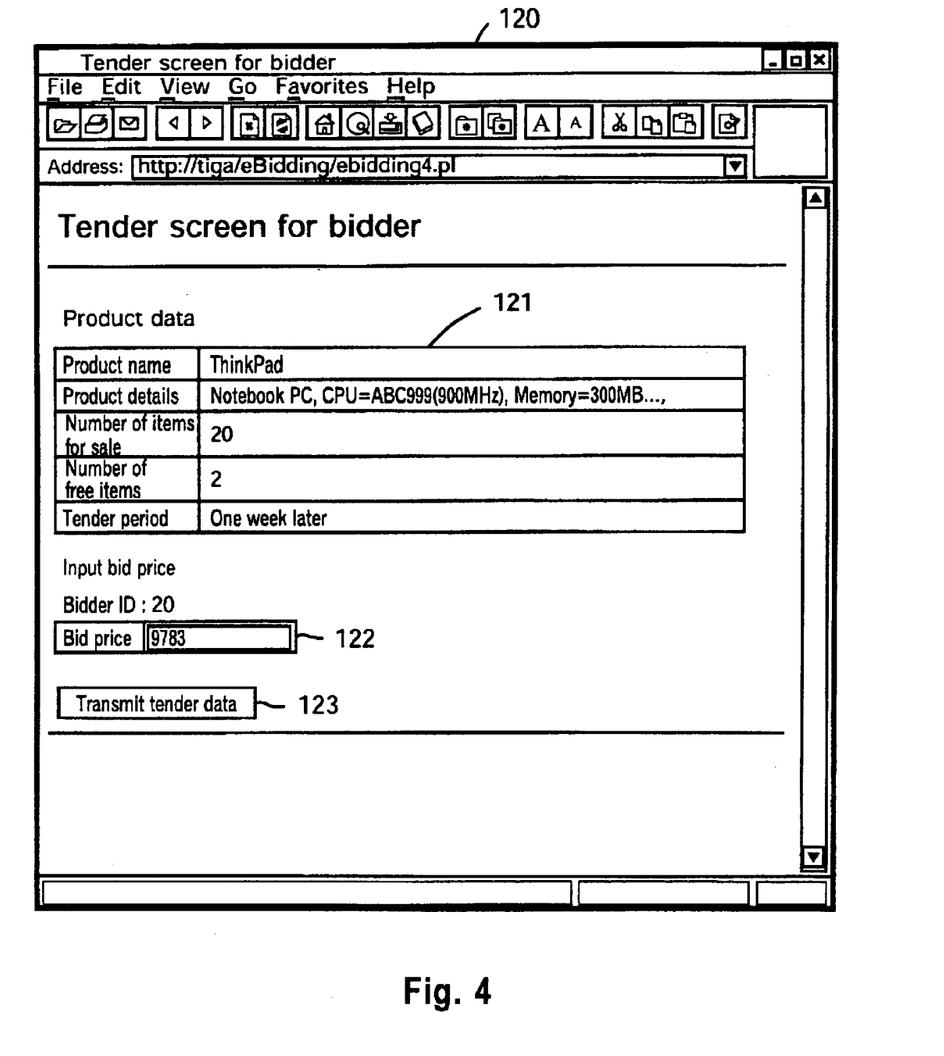
FIG. 4 is a diagram showing an example registration screen displayed on an intending purchaser terminal according to the embodiment.

FIG. 4 is a diagram showing an example purchase application registration screen (written as a tender screen for a bidder in FIG. 4) that is displayed by an intending purchaser terminal 30. A registration screen 120 is the display screen of the browser 31 of the intending purchaser terminal 30. The screen format is provided as a homepage by the web server 12 of the mediator server 10.

In FIG. 4, a product information display column 121, a purchase price bid input column 122, and a tender data transmission button 123 are provided on the registration screen 120. A product name, detailed product information, the number of items for sale, the number of free products to be provided and the registration period (written as the tender period in FIG. 4) are presented as product information in the product information display column 121. When the product information display column 121 is compared with the information input column 111 of the input screen 110 in FIG. 3, it can be seen that, except for the lowest price, all the information entered in the information input column 111 are displayed. The lowest price is not displayed because, as is described above, no unnecessary reference is provided for intending purchasers so that they will submit what they consider to be appropriate purchase price bids.

An intending purchaser refers to the product information display column 121 on the registration screen 120 displayed on the intending purchaser terminal 30, and enters a purchase price bid (written as a tender price in FIG. 4) in the purchase price bid input column 122. Then, the intending purchaser clicks on the tender data transmission button 123 to transmit the purchase price bid in the input column 122 to the mediator server 10, which registers the purchase price bid when it is received. The registration screen 120 is merely an example interface to be used for accepting the registration of a purchase application. So long as the same process can be performed, the format is not limited to the one in FIG. 4, and means other than the homepage can be employed.

Figure 5:
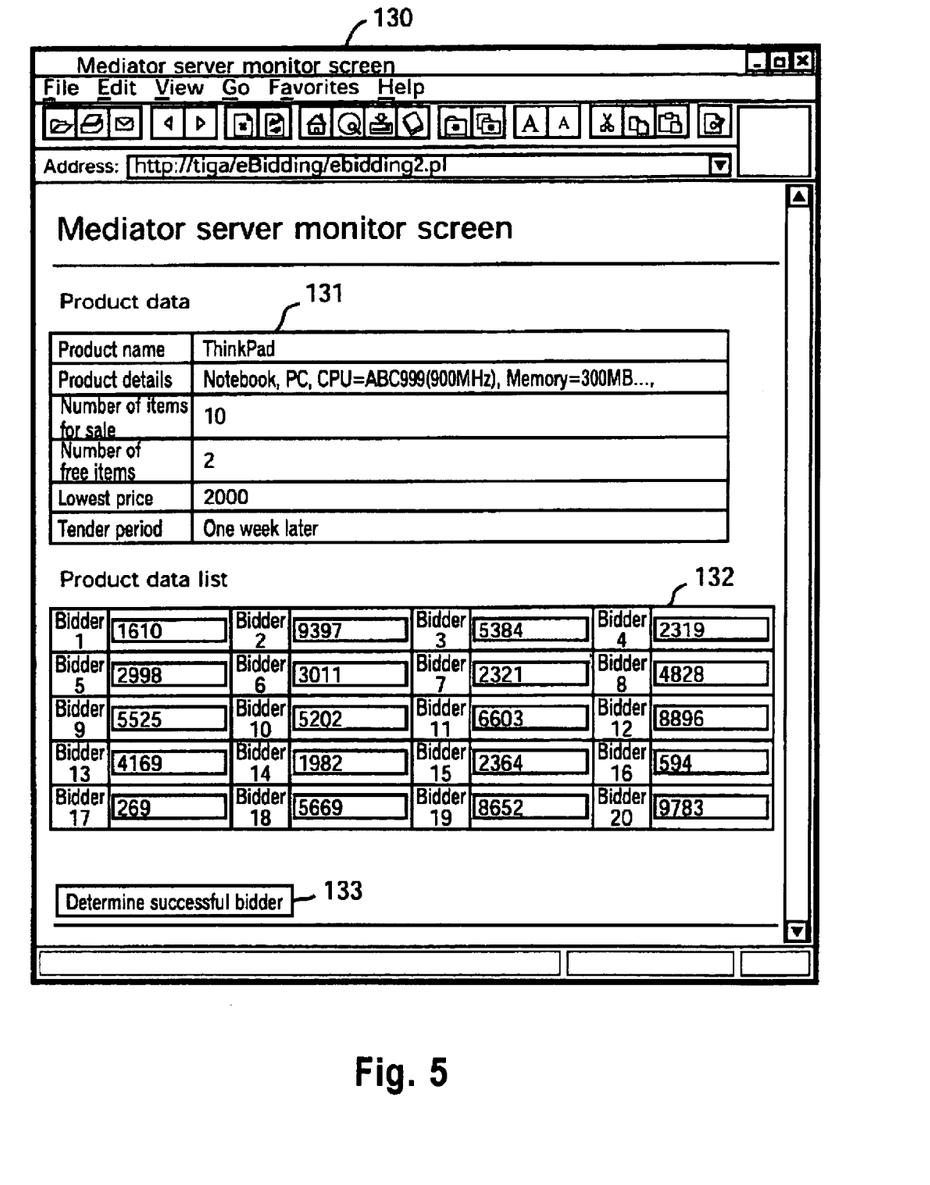
FIG. 5 is a diagram showing an example registration state display screen browsed by a mediator server according to embodiment.

FIG. 5 is a diagram showing an example registration state display screen browsed by the mediator server 10. The registration state display screen 130 is the display screen of the browser 13 of the mediator server 10, and the screen format is prepared as a homepage by the web server 12 of the mediator server 10.

In FIG. 5, a product information display column 131, an intending purchaser display column 132 and a successful bidder determination button 133 are provided on the registration state display screen 130. A product name, detailed product information, the number of items for sale, the number of free items to be provided, the lowest price and a registration period (written as a tender period in FIG. 5) are provided as product information in the product information display column 131. These match the input items of the information input column 111 of the input screen 110 in FIG. 3. Current intending purchasers (written as bidders in FIG. 5) and current purchase price bids for the product are displayed in the intending purchaser display column 132.

When the registration period designated in the product information display column 131 has elapsed, the operator of the mediator server 10 clicks on the successful bidder determination button 133. At that time, the period for the acceptance and registration of purchase applications for the product is closed, and the winner determiner 11 selects a winner from among the intending purchasers displayed in the intending purchaser display column 132. The registration state display screen 130 is merely an example interface for the mediator server 10. So long as the same process can be performed, the format is not limited to the one in FIG. 5, and means other than the homepage can be employed. Further, instead of a manual operation performed by an operator, the process may be performed under the control of a program that accepts and registers purchase applications and determines a winner automatically when the designated registration period has elapsed.

Figure 7:
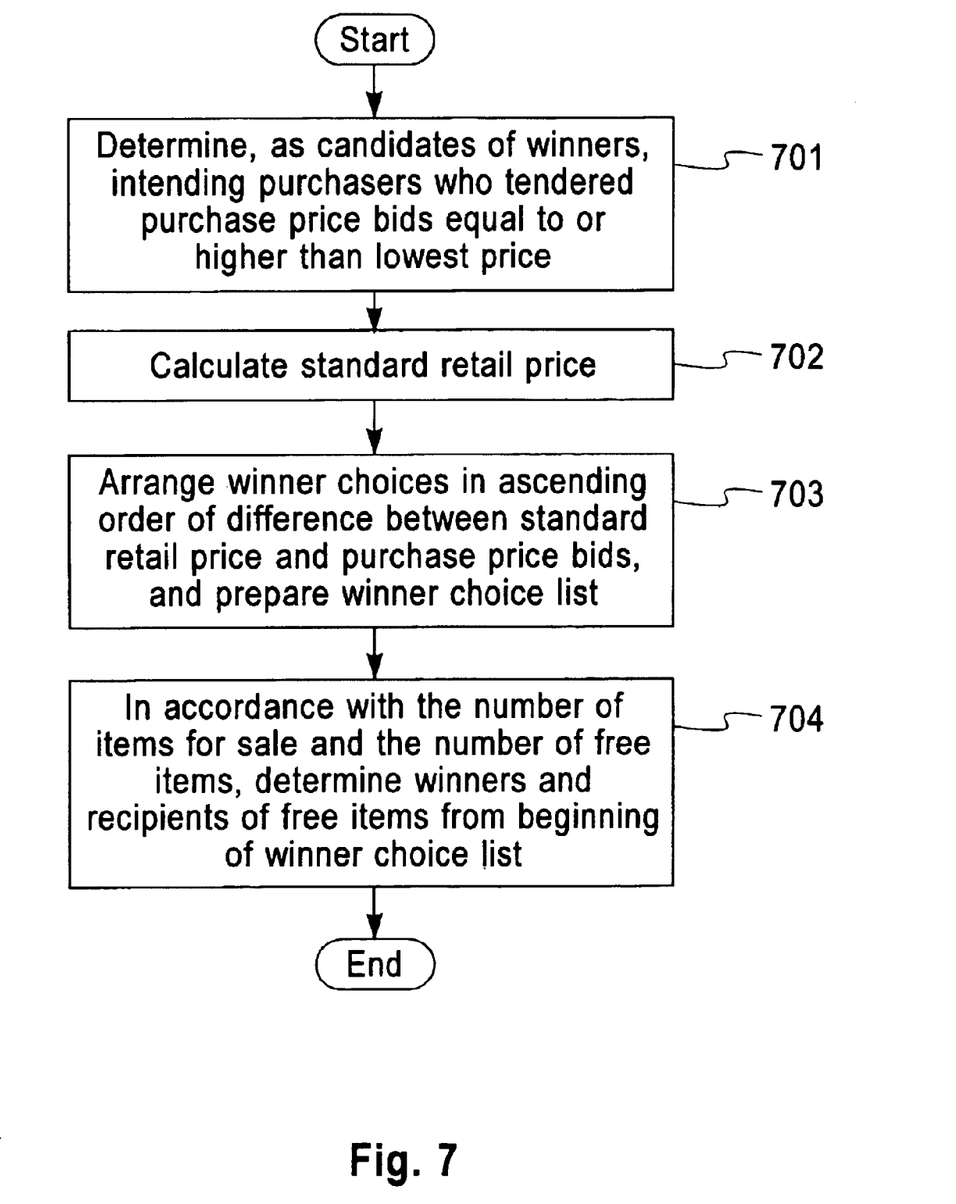
FIG. 7 is a flowchart for explaining the winner determination processing performed by the winner determiner of the mediator server.

FIG. 7 is a flowchart for explaining the winner determination processing performed by the winner determiner 11 of the mediator server 10. In FIG. 7, first, intending purchasers who are displayed in the intending purchaser display column 132 and have tendered purchase price bids equal to or higher than the lowest price are defined as winner choices (step 701). As for the information in the product information display column 131 and the intending purchaser display column 132 in FIG. 5, 16 intending purchasers, excluding four (bidders), 1, 14, 16 and 17, who tendered bids lower than the lowest price of 2000 yen, are defined as winner choices.

A standard retail price, which is based on the above described representative value, is calculated using the purchase price bids of the winner choices, i.e., the effective purchase price bids (step 702). When the average value of all the effective purchase price bids is used as the standard retail price, in the example in FIG. 5 the standard retail price obtained by the calculation is 5445.0625 yen:

(9397+5384+2319+2998+3011+2321+4828+5525+5202+6603+ 8896+4169+2364+5669+8652+9783)/16=5445.0625

The winner choices are then arranged in the ascending order of the difference between the standard retail price and the purchase price bids, and the winner choice list is prepared (step 703). When multiple winner choices tendered the same purchase price bid, the intending purchaser whose bid was registered the earliest is placed in an upper level.

In accordance with the number of units for sale and the number of free units to be provided, recipients of the free units and the winners are determined beginning at the first entry in the winner choice list (step 704). In the example in FIG. 5, since ten units are to be sold and two units are to be provided at no cost, the intending purchaser (bidder) 3 who tendered a purchase price bid of 5384 yen and the intending purchaser (bidder) 9 who tenders a purchase price bid of 5525 yen are determined to be the recipients of the free units. Similarly, the intending purchasers (bidders) 18, 10, 8, 11, 13, 6, 5 and 15 (in the order wherein the purchase price bids are closer to the standard retail price) are winners. The remaining intending purchasers (bidders) 2, 4, 7, 12, 19 and 20 are not selected and can not purchase the product.

Figure 6:
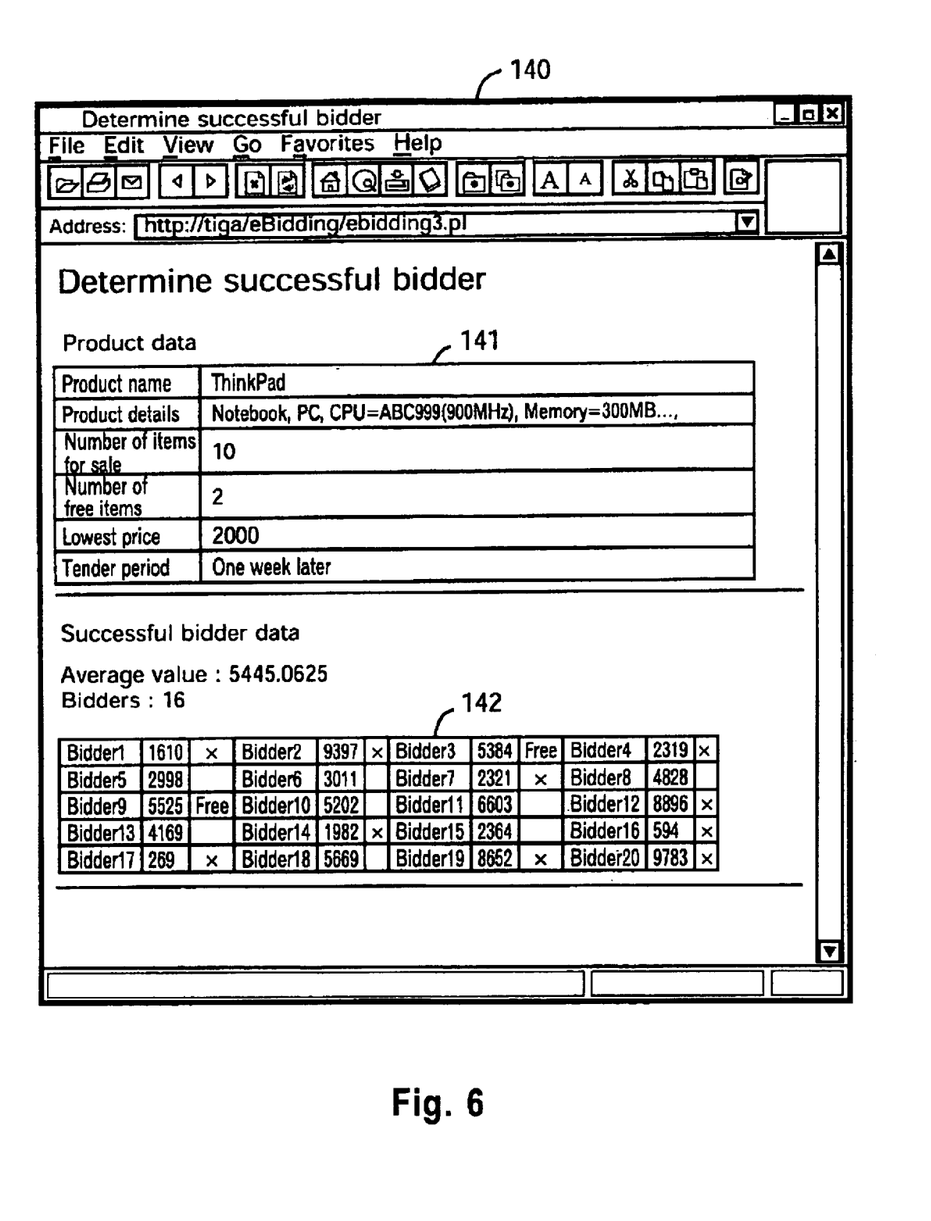
FIG. 6 is a diagram showing an example winner determination screen indicating the winners determined for the embodiment.

FIG. 6 is a diagram showing an example winner determination screen indicating the thus determined winners. In FIG. 6, a product information display column 141 and a winner display column 142 are provided for a winner determination screen 140. The data entries in the product information display column 141 are the same as those in the product information display column 131 of the registration state display screen 130 in FIG. 5. The standard retail price (written as the average value in FIG. 6), the number of registered intending purchasers (written as the bidders in FIG. 6), and a list of winners are provided in the winner display column 142. The winner determination screen 140 is merely an example interface for the mediator server 10, and so long as the same process can be performed, the format is not limited to the one in FIG. 6, and means other than the homepage can be employed.

When the winners, the recipients of the free products, and unsuccessful bidders have been determined in the above manner, the mediator server 10 transmits the bidding results to the intending purchasers, and transmits to the retailer the standard retail price, the recipients of the free products, and the winners and their purchase price bids. This notification may be transmitted as an e-mail by the mediator server 10. Or, the homepage may be prepared and upon the receipt of a request from the retailer terminal 20 or the intending purchase terminal 30, the homepage source that constitutes the winner determination screen 140 in FIG. 6 may be transmitted.

Upon the receipt of the notification from the mediator server 10, the retailer sells the product to the winners. The product is retailed at the purchase price tendered by each winner. Since the product is provided at the purchase price offered by the winner, it can be expected that the intending purchaser entered a purchase price that he or she deemed suitable for the purchase of the product. The standard retail price obtained for the determination of winners can be regarded as the standard purchase price for the purchasers of the product. Therefore, when the retail price determination system of the embodiment is employed to perform a pre-retail process, before the official sale of a specific product, and when the standard retail price is employed as the retail price of the product for the official sale, an appropriate retail price that reflects to the needs of the market can be determined. Therefore, depending on the product type or the sales style, as the search for the standard retail price may be obtained by using the retail price determination system as a survey for the purchasers, and the product may actually be sold at a retail price that is determined based on the standard retail price that is obtained by the survey.

In the above embodiment, the provider of the mediator server 10 differs from the retailer, and receives product information from the retailer terminal 20 and opens it across a communication network. However, the mediator server 10 may be combined with the retailer terminal 20, and may receive purchase applications across the communication network. In this case, the mediator server 10 and the retailer terminal 20 can be constituted as a single apparatus and, for example, the functions of the retailer terminal 20 can be carried out by the input/output terminal of the computer system that serves as the mediator server 10. In this case, the retailer would be in charge of the presentation of the product information, the acceptance and registration of purchase applications, and the determination of winners. The assembly of the mediator server 10 and the retailer terminal 20 would serve as a product provision server that would be used by the retailer to provide a product.

Furthermore, since the mediator server 10 in this embodiment is employed as an auction server, the mediator server 10 can be used for a special auction style where an intending purchaser who tendered a price bid that is closer to the price that many intending purchasers regard as appropriate can obtain the product. Specifically, in an ordinary auction, a small number of products are sold to those who submit the highest bids. Therefore, this auction system is not suitable as an example for a nonprofit organization or a public organization that provides products or services. Therefore, when the price of a product or a fee for a service is determined through an auction using the embodiment, the product or the service can be provided for many persons at an appropriate price or fee.

Further, to determine the stock price of a newly opened corporation, the system of this embodiment can be employed to actually sell stock to winners at their price bids. Thus, compared with a determination made for an opened stock price using the competitive tender formula or the book building formula, an appropriate opening price can be determined.

As is described above, according to the present invention, in electronic commerce, an appropriate retail price for a product is determined based on a purchase price bid that is tendered by a demander of the product.

Further, according to the present invention, a retailing system for electronic commerce is provided for the retail sale of a product at a price desired by the average demander of the product.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An auction server, for accepting a price bid for a product put up for auction via a communication network in support of a network auction sale, comprising:

information opening means for opening, to intending purchasers, information concerning said product put up for auction;

price bid acceptance means for accepting purchase price bids tendered by said intending purchasers; and winning bid determination means for employing said accepted purchase price bids to calculate a standard purchase price, the standard purchase price being based on amounts of all bids received for said product put up for auction, the winning bid determination means being configured to award a sale to the intending purchasers in:

a number equivalent to the count of individual units of the product put up for auction, and an arranged structure, the arranged structure including the number of intending purchasers whose purchase price bid is closest, both above and below to said standard purchase price, wherein the arranged structure includes a number of intending purchasers whose purchase price bid is closest and above said standard purchase price approximately equal to a number of intending purchases whose purchase price bid is closest and below said standard purchase price.

2. The auction server according to claim 1, wherein said winning bid determination means determines, as a remuneration recipient, said intending purchaser who tendered a purchase price bid within a predetermined range from said standard purchase price.

3. The auction server according to claim 1, wherein said winning bid determination means defines, as effective purchase price bids, said purchase price bids that are equal to or higher than the lowest price designated in advance for said product put up for auction, and employs said effective purchase price bids to calculate said standard purchase price.

4. A product retailing method for the network auction sale of a product across a communication network comprising the steps of:

using a homepage to open to intending purchasers information for said product;

employing said homepage to accept purchase price bids tendered by said intending purchasers;

determining via a computer processor, as winners of right to purchase said product, intending purchasers whose purchase price bids are included in a winning price range that is defined using said purchase price bids and the counts of units of the product that are to be provided, said winning price range being based on bids which are closest in magnitude, both above and below, to an average of all bids; and selling said product to said winners at said purchase price bids that are tendered so as to include, in approximately equal numbers, winners whose bids are closest in magnitude and below the average of all bids and winners whose bids are closest in magnitude and above the average of all bids.

5. The product retailing method according to claim 4, wherein said step of determining said winners includes the steps of:

employing said accepted purchase price bids tendered by said intending purchasers of said product to calculate a standard purchase price; and defining, as said winning price range, a price range that includes purchase price bids tendered in a number equivalent to the count of units of said product that is offered, arranged in order beginning with a purchase price bid that is closest to said standard purchase price.

6. The product retailing method according to claim 5, further comprising the step of:

determining, as remuneration recipient, an intending purchaser who tendered a purchase price bid especially close to said standard purchase price, wherein said step of selling said product includes a step of providing said product at no cost to said remuneration recipient, regardless of said purchase price bid tendered by said remuneration recipient.

7. A product purchasing method for employing an information communication terminal to purchase a product via a communication network comprising the steps of:

submitting to a bid acceptance homepage a purchase price bid for a desired product, wherein effective purchase price bids are determined as being equal to or higher than a designated lowest price for the product; and purchasing said product at said purchase price bid when said submitted purchase price bid is included in a winning price range that is defined in accordance with a count of units of the product to be provided and based on closeness to, both above and below, a standard purchase price that is calculated for said product based on all the effective purchase price bids tendered for said product, wherein the winning price range is defined so as to include an approximately equal number of submitted purchase price bids that are above the standard purchase price and below the standard purchase price.

8. A program storage device that input means of a computer employs to store a computer-readable program that permits said computer to perform:

a process for opening to intending purchasers across a communication network information concerning said product put up for auction;

a process for accepting, across said communication network, purchase price bids tendered by said intending purchasers; and a process for employing said accepted purchase price bids to calculate a standard purchase price, the standard purchase price being based on amounts of all bids received for said product put up for auction, the winning bid determination means being configured to award a sale to the intending purchasers in:

a number equivalent to the count of individual units of the product put up for auction, and an arranged structure, the arranged structure including the number of intending purchasers whose purchase price bid is closest, both above and below, to said standard purchase price, wherein the arranged structure includes a number of intending purchasers whose purchase price bid is closest and above said standard purchase price approximately equal to a number of intending purchases whose purchase price bid is closest and below said standard purchase price.

9. A program transmission apparatus comprising:

storage means for opening to intending purchasers information concerning said product put up for auction across a communication network, means for accepting purchase price bids tendered by said intending purchasers across said communication network, and means for employing said accepted purchase price bids to calculate a standard purchaser price, the standard purchase price being based on amounts of all bids received for said product put up for auction, the winning bid determination means being configured to award a sale to the intending purchases in:

a number equivalent to the count of individual units of the product put up for auction, and an arranged structure, the arranged structure including the number of intending purchasers whose purchase price bid is closest, both above and below, to said standard purchase price; and transmission means reading said program from said storage means and for transmitting that program, wherein the arranged structure includes a number of intending purchasers whose purchase price bid is closest and above said standard purchase price approximately equal to a number of intending purchases whose purchase price bid is closest and below said standard purchase price.

* * * * *